United States Patent
Lee

(10) Patent No.: US 9,481,289 B2
(45) Date of Patent: Nov. 1, 2016

(54) CIRCUIT FOR DISCHARGING AT INPUT STAGE OF A DRIVER IC

(75) Inventor: Young Wuk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 202 days.

(21) Appl. No.: 14/005,344

(22) PCT Filed: Jul. 19, 2011

(86) PCT No.: PCT/KR2011/005289
§ 371 (c)(1),
(2), (4) Date: Sep. 16, 2013

(87) PCT Pub. No.: WO2012/128426
PCT Pub. Date: Sep. 27, 2012

(65) Prior Publication Data
US 2014/0001954 A1 Jan. 2, 2014

(30) Foreign Application Priority Data

Mar. 24, 2011 (KR) .................. 10-2011-0026298

(51) Int. Cl.
*B60Q 1/02* (2006.01)
*B60Q 1/06* (2006.01)
*H05B 41/288* (2006.01)

(52) U.S. Cl.
CPC ............. *B60Q 1/06* (2013.01); *H05B 41/2885* (2013.01); *Y02B 20/202* (2013.01)

(58) Field of Classification Search
CPC ................ B60Q 1/1423; B60Q 1/143; B60Q 2300/314
USPC ....... 315/82, 83, 76–81, 363, 307–311, 224; 327/310–313, 108–112, 408, 544; 326/82, 83
See application file for complete search history.

(56) References Cited

U.S. PATENT DOCUMENTS

| 5,184,034 A | 2/1993 | Ohannes et al. ............. 307/473 |
| 5,751,115 A | 5/1998 | Jayaraman et al. .......... 315/225 |

(Continued)

FOREIGN PATENT DOCUMENTS

| CN | 101060740 A | 10/2007 |
| EP | 0 830 982 | 3/1998 |

(Continued)

OTHER PUBLICATIONS

Gentchev A et al: "Pentium II Power Supplies: Too Young to Smoke", EDN Electrical Design News, Reed Business Information, Highlands Ranch, CO, US, vol. 44, No. 2, Jan. 21, 1999, XP000878306, ISSN: 0012-7515.

(Continued)

*Primary Examiner* — Lincoln Donovan
*Assistant Examiner* — Thomas Skibinski
(74) *Attorney, Agent, or Firm* — Ked & Associates, LLP

(57) ABSTRACT

A discharge path circuit, the circuit providing a discharge path for an input terminal of an IC (Integrated Circuit) formed with a power input port connected to a first input and an operation mode selection port connected to a second port, the circuit comprising: an LC filter unit interconnected between the power input port and the first input to filter a noise in power; a first resistor interconnected between the first input and the second input; and a second resistor interconnected between the second input and a ground to provide a discharge path.

8 Claims, 3 Drawing Sheets

(56) References Cited

U.S. PATENT DOCUMENTS

| | | | | |
|---|---|---|---|---|
| 6,313,616 | B1 | 11/2001 | Deller et al. | 323/282 |
| 2003/0090310 | A1* | 5/2003 | Amick et al. | 327/310 |
| 2007/0019443 | A1 | 1/2007 | Ito et al. | 363/16 |
| 2010/0029109 | A1 | 2/2010 | Lam et al. | 439/136 |
| 2013/0038354 | A1* | 2/2013 | Lee | 327/108 |

FOREIGN PATENT DOCUMENTS

| | | |
|---|---|---|
| EP | 1 679 797 A1 | 7/2006 |
| JP | 2002-519809 | 7/2002 |
| JP | 3154763 U | 10/2009 |
| WO | WO 2010/112238 A1 | 10/2010 |

OTHER PUBLICATIONS

Japanese Office Action dated Aug. 5, 2014 issued in Application No. 2014-500977.
European Search Report dated Aug. 6, 2014 issued in Application No. 11 861 528.5.
Chinese Office Action dated Mar. 25, 2015 issued in Application No. 201180069546.7.
International Search Report issued in Application No. PCT/BR2011/005289, dated Mar. 22, 2012.

* cited by examiner

CIRCUIT FOR DISCHARGING AT INPUT STAGE OF A DRIVER IC

CROSS-REFERENCE TO RELATED PATENT APPLICATIONS

This application is a U.S. National Stage Application under 35 U.S.C. §371 of PCT Application No. PCT/KR2011/005289, filed Jul. 19, 2011, which claims priority to Korean Patent Application No. 10-2011-0026298, filed Mar. 24, 2011.

TECHNICAL FIELD

The teachings in accordance with the exemplary embodiments of this invention relate generally to a circuit for discharging at an input stage of a driver IC, and more particularly to a discharge path circuit adapted to a power unit of a driver IC (Integrated Chip) for driving an actuator in head lamps of a vehicle.

BACKGROUND ART

Unlike the older conventional vehicles, modern vehicles are equipped with various electronic devices for convenience and safety, and vehicles recently manufactured are mounted with many electronic parts. Particularly, an adaptive head lamp system controlling movement of vehicular head lamp is equipped with many electronic parts. The adaptive head lamp system moves a head lamp in response to a traveling direction and a traveling speed of a vehicle to allow an area illuminated by the head lamp to match the movement of the vehicle, to be more particularly, to match a driver's visual field (sight).

In order to change the movement of a head lamp in response to a traveling direction or a traveling speed of a vehicle while movement of the head lamp is being controlled, a faster response speed of a head lamp driving circuit is needed. Thus, reducing a charging/discharging time of a driving circuit of a head lamp is needed. Particularly, a certain automobile manufacturing company standardizes the charging/discharging time of a head lamp, such that a technology to control the charging/discharging time of a head lamp below a standard level is necessary.

DISCLOSURE OF INVENTION

Technical Problem

The present invention is directed to solve at least one or more of the aforementioned problems in whole or in part and to provide a circuit for reducing a discharging time by adding a new circuit to an input terminal of a driver IC (Integrated Chip) configured to drive a head lamp.

Technical problems to be solved by the present invention are not restricted to the above-mentioned, and any other technical problems not mentioned so far will be clearly appreciated from the following description by skilled in the art.

Solution to Problem

An object of the invention is to overcome at least one or more of the above problems and/or disadvantages in whole or in part, and/or provide at least the advantages described hereinafter, and/or make improvements in the prior art. In order to achieve at least the above objects, in whole or in part, and in accordance with the purposes of the invention, as embodied and broadly described, and in one general aspect of the present invention, there is provided a discharge path circuit, the circuit providing a discharge path for an input terminal of an IC (Integrated Circuit) formed with a power input port connected to a first input and an operation mode selection port connected to a second port, the circuit characterized by: an LC filter unit interconnected between the power input port and the first input to filter a noise in power; a first resistor interconnected between the first input and the second input; and a second resistor interconnected between the second input and a ground to provide a discharge path.

Preferably, the first input is inputted with a power for driving the IC.

Preferably, the second input is inputted with a signal for operation mode of the IC.

Preferably, the LC filter unit includes an inductor interposed between the first input and the power input port and a capacitor interposed between the power input port and the ground.

Preferably, an inductance value of the inductor is 2.2 µH, and a capacitance value of the capacitor is 220 µF.

Preferably, a resistance value of the first resistor is 1 kΩ and a resistance value of the second resistor is 750Ω.

Preferably, a DC power charged in the power input port is discharged through the second resistor when the first input is turned off.

Advantageous Effects of Invention

The exemplary embodiments of the present invention have advantageous effect in that a discharge time of an input terminal at a driver IC of a head lamp can be reduced to accurately control movement of the head lamp.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
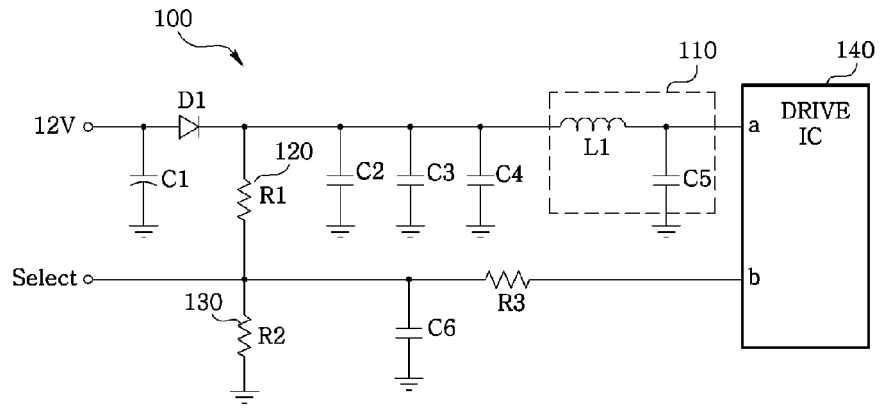
FIG. 1 is a schematic circuit diagram of an input terminal at a driver IC according to an exemplary embodiment of the present invention.
Figure 2:
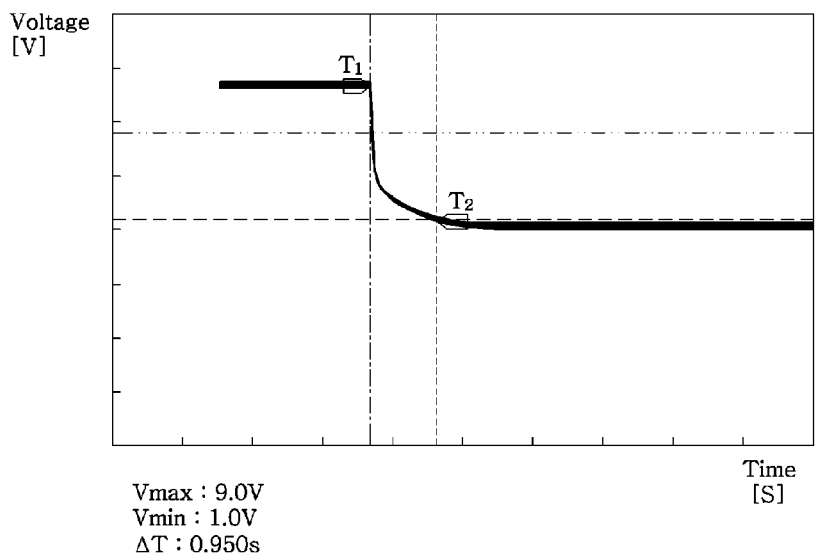
FIG. 2 is a schematic view showing a voltage change in response to a discharge operation of an input terminal at a driver IC according to prior art.
Figure 3A:
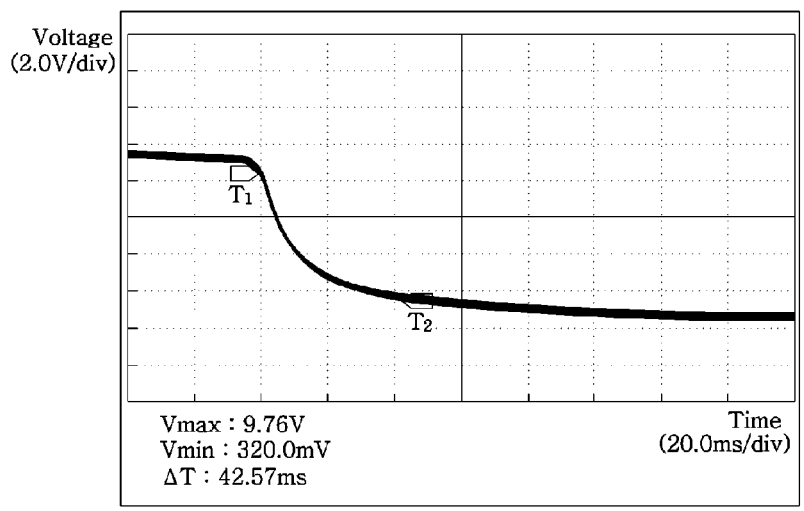
FIGS. 3a through 3d are schematic views of a voltage change at a discharge operation of an input terminal at a driver IC according to another exemplary embodiment of the present invention.
Figure 3B:
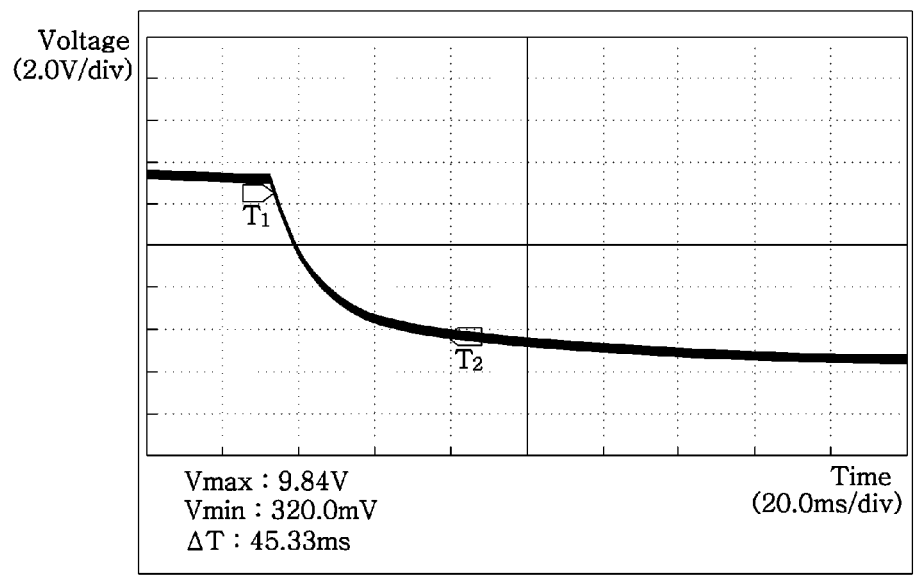
Figure 3C:
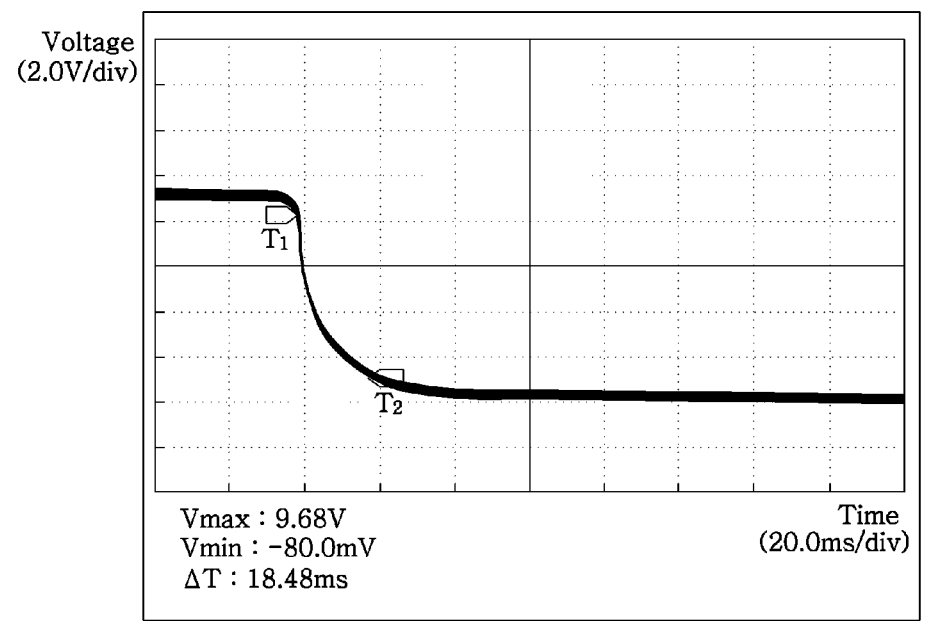
Figure 3D:
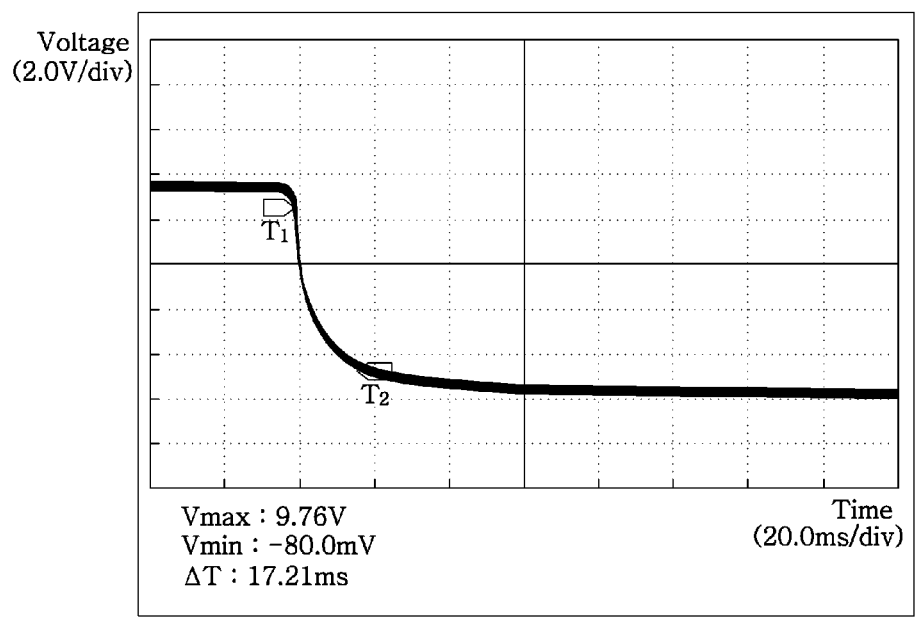

The disclosed embodiments and advantages thereof are best understood by referring to FIGS. 1-3 of the drawings. Other features and advantages of the disclosed embodiments will be or will become apparent to one of ordinary skill in the art upon examination of the following figures and detailed description.

It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof may be used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientation relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It is to be understood that, as used in the specification and in the claims, the singular forms "a," "an," and "the" include plural referents unless the context clearly dictates otherwise. Thus, for example, reference to "a component surface" includes reference to one or more of such surfaces.

Now, the present invention will be described in detail with reference to the accompanying drawings.

FIG. 1 is a schematic circuit diagram illustrating a circuit (100) at an input terminal of a driver IC according to an exemplary embodiment of the present invention.

The circuit (100) may include a driver IC (140), an LC filter unit (110), a plurality of capacitors (C1, C2, C3, C4) interposed between a ground and a power source of the driver IC, and first and second resistors (120, 130) for discharging a charged voltage or absorbing EMI (Electro Magnetic Interference) noise.

The LC filter unit (110) may include an inductor (L1) interposed between a power input port (a) of the driver IC and a power source that has passed a diode (D1), and a capacitor (C5) interposed between the power input port (a) and a ground. An end of first resistor (R1, 120) is connected to a power source that has passed the diode (D1), and the other end of the first resistor (120) is connected to an operation mode selection input and an end of the second resistor (R2, 130), where the other end of the second resistor (R2, 130) may be grounded.

Furthermore, the operation mode selection input may be connected to an operation mode selection port (b) through a third resistor (R3), and a capacitor (C6) may be connected between the operation mode selection input and the ground. An end of the capacitor (C1) may be connected to the power source, and the other end of the capacitor (C1) may be connected to the ground.

The plurality of capacitors (C1, C2, C3, C4) connected between the ground and the power source of driver IC are for decoupling and serve to charge and discharge low frequency or high frequency components inputted from the power source. The driver IC (140) may be ANIS 30623, for example.

The discharge path circuit of an input terminal at a driver IC (Integrated Chip) of a vehicle head lamp according to an exemplary embodiment of the present invention is a circuit providing a discharge path formed with the power input port (a) of the driver IC connected to the first input and the operation mode selection port connected to the second input, and may include an LC filter unit (110) connected between the power input port (a) and the first input, a first resistor (120) connected between the first input and the second input, and a second resistor (130) connected between the second input and the ground.

The first input is a power source (e.g., DC 12 V power source) for driving the IC, and the second input may be an operation mode selection input, that is, a signal for the operation mode selection (e.g., for selecting a left head lamp or a right head lamp).

The LC filter unit (110) may include an inductor (L1) connected between the first input and the power input port (a), a capacitor (C5) connected between the power input port (a) and the ground, where an inductance value of the inductor (L1) may be 2.2 µH, and a capacitance value of the capacitor may be 220 µF. A resistance value of the first resistor may be 1 kΩ and a resistance value of the second resistor may be 750Ω.

For example, in a case an operation mode is a mode for controlling a left head lamp, the second input may be opened, where the operation mode selection port (b) and the first input may be connected through the first and second resistors. For example, in a case an operation mode is a mode for controlling a right head lamp, the second input may be connected to the ground, where the operation mode selection port (b) may be connected to the ground through a third resistor.

Furthermore, in a case a power source (DC, 12V) is inputted to continuously operate the driver IC, and the power source is turned off to input a signal to the second input for controlling the left head lamp, the 12V voltage charged in a power source terminal is discharged through the first and second resistors (120, 130).

FIG. 2 is a schematic view showing a voltage change in response to a discharge operation of an input terminal at a driver IC according to prior art, where a voltage was measured at the power source side of an input terminal during discharge operation that occurs at the input terminal of driver IC of head lamp when a left head lamp is selected according to prior art, where it can be checked that a time necessary for discharge is approximately 0.95 second.

For example, if a time necessary for discharge is set at 100 msec, the power source terminal of driver IC according to prior art and a discharge operation of the operation mode selection terminal cannot satisfy the specification. The above-mentioned value of 100 msec is a reference value, where the reference value is a special value at an applicable exemplary embodiment for realizing the driver IC for driving a vehicular head lamp. Therefore, the reference value may vary based on an individual applicable exemplary embodiment.

MODE FOR THE INVENTION

FIGS. 3a through 3d are schematic views of a voltage change at a discharge operation of an input terminal at a driver IC according to another exemplary embodiment of the present invention, where a voltage was measured at the power source side of an input terminal during discharge operation that occurs at the input terminal of driver IC of head lamp.

Referring to FIGS. 3a through 3d, a measurement result according to the exemplary embodiment of the present invention was 18.48 msec~45.25 msec, where the result can be checked as having improved much over that of the prior art illustrated in FIG. 2.

As apparent from the foregoing, a discharge time of an input terminal at a driver IC of a head lamp can be reduced to accurately control movement of the head lamp.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has industrial applicability in that a discharge time of an input terminal at a driver IC of a head lamp can be reduced to accurately control movement of the head lamp.

The invention claimed is:

1. A discharge path circuit providing a discharge path for an input terminal of an IC (Integrated Circuit) having a power input port connected to a first input and an operation mode selection port connected to a second input, the circuit characterized by:
    an LC filter unit interconnected between the power input port and the first input to filter a noise in power;
    a first resistor interconnected between the first input and the second input; and
    a second resistor interconnected between the second input and a ground to provide the discharge path, wherein a first end of the second resistor is connected to the first resistor and a second end of the second resistor is connected to the ground,
    wherein a DC power charged in the power input port is discharged through the second resistor when the first input is turned off, and
    wherein a first end of the LC filter unit is connected to a first node coupled to the first input and a second end of the LC filter unit is connected to a second node coupled to the power input port of the IC, and
    a first end of the first resistor is connected to the first node and a second end of the first resistor is connected to a third node coupled to the second input.

2. The discharge path circuit of claim 1, characterized in that the first input is inputted with a power for driving the IC.

3. The discharge path circuit of claim 1, characterized in that the second input is inputted with a signal for operation mode of the IC.

4. The discharge path circuit of claim 1, characterized in that the LC filter unit includes:
    an inductor interposed between the first input and the power input port; and
    a capacitor interposed between the power input port and the ground.

5. The discharge path circuit of claim 4, characterized in that an inductance value of the inductor is 2.2 µH, and a capacitance value of the capacitor is 220 µF.

6. The discharge path circuit of claim 1, characterized in that a resistance value of the first resistor is 1 kΩ and a resistance value of the second resistor is 750Ω.

7. The discharge path circuit of claim 1, wherein the first end of the second resistor is connected to the second end of the first resistor at the third node and the second end of the second resistor is connected to the ground.

8. The discharge path circuit of claim 1, wherein the first and second resistors are passive devices.

* * * * *